(12) United States Patent
Adler et al.

(10) Patent No.: US 11,933,338 B2
(45) Date of Patent: Mar. 19, 2024

(54) BICYCLE PANNIER MOUNTING ARRANGEMENT

(71) Applicant: Thule Sweden AB, Hillerstorp (SE)

(72) Inventors: Jan Adler, Skillingaryd (SE); David Ardmar, Bankeryd (SE)

(73) Assignee: Thule Sweden AB, Hillerstorp (SE)

( * ) Notice: Subject to any disclaimer, the term of this patent is extended or adjusted under 35 U.S.C. 154(b) by 765 days.

(21) Appl. No.: 16/868,283

(22) Filed: May 6, 2020

(65) Prior Publication Data
US 2020/0370576 A1   Nov. 26, 2020

(30) Foreign Application Priority Data
May 21, 2019   (EP) .................................... 19175748

(51) Int. Cl.
| | | |
|---|---|---|
| *B62J 9/23* | (2020.01) | |
| *B62J 7/08* | (2006.01) | |
| *F16B 2/10* | (2006.01) | |
| *F16B 2/18* | (2006.01) | |

(52) U.S. Cl.
CPC ................ *F16B 2/185* (2013.01); *B62J 7/08* (2013.01); *B62J 9/23* (2020.02); *F16B 2/10* (2013.01)

(58) Field of Classification Search
CPC ......... B62J 7/08; B62J 7/04; B62J 9/00; B62J 9/001; B62J 9/003; B62J 9/23; B62J 9/27; B62J 11/00; F16B 2/185; F16B 2/10

See application file for complete search history.

(56) References Cited

U.S. PATENT DOCUMENTS

| | | | |
|---|---|---|---|
| 5,884,372 A | 3/1999 | Anscher et al. | |
| 8,028,877 B2 * | 10/2011 | Lien ........................... | B62J 9/27 224/419 |
| 8,292,139 B2 * | 10/2012 | Golub ........................ | B62J 7/08 224/558 |
| 9,694,867 B2 * | 7/2017 | Ton ........................ | B62H 5/003 |
| 2010/0108729 A1 | 5/2010 | Golub et al. | |
| 2018/0266148 A1 | 9/2018 | Bunyer et al. | |

FOREIGN PATENT DOCUMENTS

WO      2016071092 A1     5/2016

OTHER PUBLICATIONS

European Search Report and Written Opinion for EP Application No. 19175748.3, dated Dec. 6, 2019, 6 pages.

* cited by examiner

*Primary Examiner* — Corey N Skurdal
(74) *Attorney, Agent, or Firm* — Sterne, Kessler, Goldstein & Fox P.L.L.C.

(57) ABSTRACT

The present disclosure relates to a bicycle pannier mounting arrangement for mounting a bicycle pannier to a bicycle. The bicycle pannier mounting arrangement includes a locking device for locking the bicycle pannier to an element of the bicycle. The locking device includes a first hook member and a second hook member. The first hook member includes an inner seat surface configured to enclose a portion of the element of the bicycle. The second hook member is pivotally connected about a pivot axis by a pivotal connection with respect to the first hook member such that the second hook member can be pivoted between an open position and a retaining position. The second hook member includes a retaining portion for retaining the element of the bicycle and a lever arm portion connected to the retaining portion and extending beyond an outer peripheral surface of the first hook member.

23 Claims, 8 Drawing Sheets

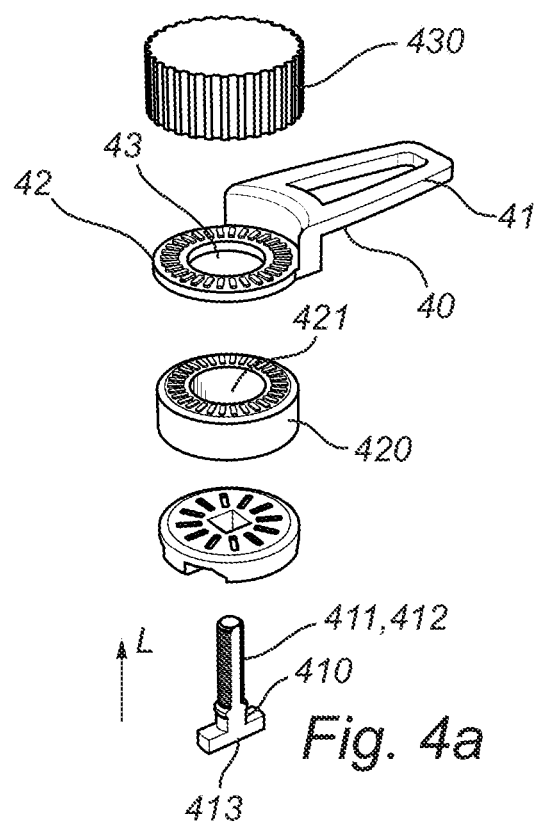

BICYCLE PANNIER MOUNTING ARRANGEMENT

CROSS REFERENCE TO RELATED APPLICATION

This application claims priority to EP Application No. 19175748.3, filed May 21, 2019, which is hereby incorporated herein in its entirety by reference.

TECHNICAL FIELD

The present disclosure relates to a bicycle pannier mounting arrangement for mounting a bicycle pannier to a bicycle. The present disclosure further relates to a bicycle pannier comprising the bicycle pannier mounting arrangement.

BACKGROUND

Bicycle panniers, also known as bicycle carrier bags, are well known and used for being connected to bicycles to increase the loading/carrying capacity of the bicycle. The bicycle panniers may for example be configured to be attached to the bicycle frame and/or to a bicycle rack at a side of the bicycle, such as at a side close to either the front or the rear wheel.

The bicycle panniers may be mounted to the bicycle by a bicycle pannier mounting arrangement comprising hooks or the like provided on the bicycle pannier which are configured for connecting the bicycle pannier to e.g. an element of the frame of the bicycle.

US 2010/0108729 A1 discloses a pannier mounting system including a pair of hooks that are positioned at generally opposite ends of a handle securing a pannier to a bicycle. A latch and a stop cooperate with each hook to snuggly enclose a rail in a manner that is generally independent of the cross-sectional size/shape of the rail. The latch is connected to the hook by a pivot and extends outward generally under the hook. The stop is pivotably and slidably connected to the hook and cooperates with the hook to generally fix a position of the latch. Translation of the handle toward the hooks closes and locks the latch about a rail member and translation of the handle away from the hooks unlocks the latch so that the mounting system can be removed from a rail.

Even though the aforementioned design may provide a solution that works for different types of bicycles, a drawback is that it is a rather complicated design with many different parts. Hence, the design would likely be costly and may also due to its complexity not provide a reliable and secure locking to a bicycle during frequent use.

SUMMARY

In view of the above, an object of the present disclosure is to provide an improved bicycle pannier mounting arrangement which alleviates at least one of the drawbacks of the prior art. More particularly, an object of the present disclosure is to provide a bicycle pannier mounting arrangement having a reliable and cost-efficient locking function.

The object is achieved by the subject-matter in independent claim 1. Advantageous embodiments may be found in the dependent claims and in the accompanying description and drawings.

According to a first aspect of the present disclosure, the object is achieved by a bicycle pannier mounting arrangement for mounting a bicycle pannier to a bicycle which comprises a locking device for locking the bicycle pannier to an element of the bicycle. The locking device comprises a first hook member comprising an inner seat surface being adapted for enclosing a portion of the element. The locking device further comprises a second hook member. The second hook member is pivotally connected about a pivot axis by a pivotal connection with respect to the first hook member such that the second hook member can be pivoted between an open position and a retaining position, whereby in the open position the element can be inserted into and removed out from the locking device, and whereby in the retaining position the first hook member and the second hook member are configured to enclose the element such that it is securely attached to the locking device. The second hook member comprises a retaining portion for retaining the elongated element when in the retaining position and a lever arm portion rigidly connected to the retaining portion. The lever arm portion extends beyond an outer peripheral surface of the first hook member, wherein the outer peripheral surface is provided on an opposite side of the first hook member with respect to the seat surface, and wherein the lever arm portion comprises a locking portion which is configured to pivotally lock the second hook member with respect the first hook member when in the retaining position by engaging the locking portion with cooperating locking means provided on the first hook member. The locking means are preferably provided on the outer peripheral surface of the first hook member.

The bicycle pannier mounting arrangement as disclosed herein has shown to provide a cost-efficient and reliable configuration. More particularly, by providing a second hook member which comprises the retaining portion and the lever arm portion which are rigidly connected to each other, a reliable locking function is provided by use of few separate components. The expression "rigidly connected" as used herein with respect to the retaining portion and the lever arm portion means that the retaining portion and the lever arm portion are connected by a non-pivotal connection. Preferably, the retaining portion and the lever arm portion are formed by one single piece of material, thereby reducing the number of separate components of the locking device. Further, by the fact that the retaining portion and the lever arm portion are rigidly connected, improved leverage may be provided when the second hook member is pivoted between the open position and the retaining position for locking the bicycle pannier to the element of the bicycle. Thereby a more secure attachment may be provided which reduces the risk of involuntary detachment caused by e.g. vibrations during use of the bicycle. The element is preferably an elongated element of the bicycle, such as a portion of the bicycle frame or a portion of a bicycle rack, whereby the first hook member and the second hook member preferably are configured to enclose a portion of an envelope surface of the elongated element when the second hook member is in the retaining position.

Optionally, the retaining portion may extend at least partly from the pivotal connection to a portion adapted to be in contact with the element when in the retaining position, and a length of the lever arm portion is longer than a length of the retaining portion between the pivotal connection and the portion which is adapted to be in contact with the element when in the retaining position. Thereby, the leverage effect may be even further improved, which in turn will further assure a secure attachment to the element of the bicycle.

Optionally, the pivotal connection may be configured to be movable, as seen in a sectional plane being perpendicular to the pivot axis, such that the locking portion of the lever arm portion can be moved between an engaged position and a disengaged position with respect to the locking means. Still optionally, the pivotal connection may be movable in an aperture provided in the locking device, wherein preferably the aperture is an elongated slot. Further, the aperture may optionally be provided in the first hook member. By configuring the locking device in the above manner, a simplified and efficient release function can be provided. It has namely been found that a user may pull directly or indirectly in the second hook member without the need of excessive force such that the pivotal connection is moved and such that the locking means thereby is disengaged from the locking portion. Thereby, the bicycle pannier may be released from the bicycle in an easy manner and also by e.g. a user which is not capable of providing a large pulling force.

Still optionally, the bicycle pannier mounting arrangement may further comprise a releasing member connected to the second hook member and adapted for releasing the second hook member from its retaining position, whereby pulling in the releasing member moves the pivotal connection, preferably in the aperture, such that the locking portion is released to its disengaged position. Just as a matter of example, the releasing member may be a flexible member, such as a rope, a belt, a strap or any other equivalent means. Further, the releasing member may preferably comprise a gripping section for a user which is adapted to provide a firm grip of the releasing member such that a sufficient pulling force can be generated.

Optionally, the locking portion of the lever arm portion may be configured to flex elastically such that it is engaged with the locking means when the second hook member is in the retaining position. Still optionally, the locking portion which is configured to flex elastically may be integrated with the lever arm portion such that the lever arm portion and the locking portion are made by one single piece of material. Just as a matter of example, the lever arm portion and the integrated locking portion may be made of one single piece of a polymer material.

Optionally, the locking device may be configured such that a force provided on the retaining portion by the element of the bicycle when the second hook member is in the retaining position is substantially provided in the opposite direction to a corresponding locking force provided to the locking portion by the locking means. It has namely been realized that configuring the locking device in this manner may provide a more reliable locking function. For example, if an increased force is generated on the retaining portion by the element caused by e.g. vibrations, the locking force provided to the locking portion will also increase, but substantially in the opposite direction. By having the two forces substantially aligned, as seen in a sectional plane being perpendicular to the pivot axis, the risk that the locking portion will be detached during vibrations can be reduced.

Optionally, the retaining portion may comprise an elastic portion adapted for contacting the element when the second hook member is in the retaining position. This has shown to be beneficial for protecting the element from unnecessary damages, scratches etc. Further, the elastic portion has also shown to further improve the locking function. In fact, the locking force provided on the locking portion can be further increased since the elastic portion may allow the locking portion to be tightened further when the second hook element is provided to the retaining position by pivoting the second hook member. Preferably, the elastic portion is provided on a rigid portion of the retaining device.

Optionally, the locking means of the first hook member may comprise a plurality of locking teeth. The plurality of locking teeth are preferably provided along a curvature profile having a constant or varying radius, as seen in a sectional plane which is perpendicular to the pivot axis. The plurality of teeth allows the locking device to be locked to elements of different sizes. Further, it may also allow the locking device to be tightened to an element with a high locking force.

Optionally, the plurality of locking teeth may be rounded, as seen in a sectional plane being perpendicular to the pivot axis. Thereby, during tightening of the second hook member into the retaining position, a sufficient locking force may be provided by a user without the need of using a too high tightening force. In fact, when the second hook member is brought to the retaining position by a user, the rounded locking teeth may provide a lower resistance force compared to what for example more sharp locking teeth would provide.

Optionally, the second hook member may be pivotable between the retaining position and the open position such that the locking portion moves along a curvature profile of the first hook member having a first section comprising the locking means and a second section which is free from the locking means, whereby the first section is having a larger radius than a radius of the second section, when seen in a sectional plane being perpendicular to the pivot axis. Preferably, the curvature profile may be provided on the outer peripheral surface of the first hook member. Thereby it may be easier for a user to move the second hook member between the open position and the retaining position, and vice versa, since there will be a reduced risk of large resistance forces provided on the second hook member when moved along the second section. Further, the larger radius of the first section may provide a larger locking force when tightening the second hook member to the retaining position.

Optionally, the seat surface may be substantially parabola shaped, when seen in a sectional plane being perpendicular to the pivot axis. By forming the seat surface in this manner, the locking device may more easily be locked to elements of different sizes.

Optionally, the bicycle pannier mounting arrangement may comprise two or more locking devices as disclosed herein which are offset with respect to each other in a direction parallel to the pivot axis. Thereby, a further improved locking of the bicycle pannier may be provided. Still optionally, in order to improve the flexibility of the bicycle pannier mounting arrangement, the two or more locking devices may be adapted to be movable with respect to each other in the direction being parallel to the pivot axis, such as for example slidably movable.

Optionally, the bicycle pannier mounting arrangement may further comprise a third hook member for locking the bicycle pannier to another portion of the bicycle, wherein the third hook member is offset from the locking device, when seen in a sectional plane being perpendicular to the pivot axis. Preferably, the third hook member is releasable such that it may be released from the bicycle pannier mounting arrangement.

According to a second aspect of the present disclosure, the object is achieved by a bicycle pannier comprising the bicycle pannier mounting arrangement according to any one of the embodiments of the first aspect of the disclosure.

According to a third aspect of the present disclosure, a bicycle pannier mounting arrangement comprising a releasable hook member arrangement is provided.

The releasable hook member arrangement comprises:

an elongated element extending in a longitudinal direction, wherein the elongated element is preferably cylindrically formed and/or is having threads on an envelope surface thereof, a hook member comprising a hook portion and a connection portion, wherein the connection portion preferably comprises a bore, for connecting the hook member to the elongated element, and wherein the hook portion is adapted to extend substantially in a direction being perpendicular to the longitudinal direction when the hook member is connected to the elongated element, at least one distance element comprising a bore for connecting the at least one distance element to the elongated element, and a locking member, such as a nut member, for locking the hook member and the at least one distance element to the elongated element, wherein preferably the locking is provided by engaging the threads of the elongated element by corresponding threads provided on the locking member, wherein the hook member is configured such that the hook portion and the connection portion are offset, as seen in the longitudinal direction, when the hook member is connected to the elongated element.

By the above mentioned configuration of the hook member arrangement, a more flexible hook configuration is provided. More particularly, by configuring the hook member such that the connection portion and the hook portion are offset in the longitudinal direction as defined in the above, a distance from the hook portion to a bicycle pannier back surface may be varied easily by releasing the hook member and turning it around in an opposite direction. Still further, by use of the at least one distance element, the distance from the hook portion to the back surface can be further varied by positioning the hook member and the at least one distance element in different order on the elongated element. It shall be noted that all embodiments of the third aspect of the disclosure are combinable with all embodiment of the first and second aspects of the disclosure, and vice versa.

The elongated element is preferably adapted to be movable in a track, or the like, in a direction being substantially perpendicular to the longitudinal direction. The elongated element may further comprise a T-shaped end which is adapted to be movable in a correspondingly formed track such that the elongated element can be movable in the direction being substantially perpendicular to the longitudinal direction.

BRIEF DESCRIPTION OF THE DRAWINGS

With reference to the appended drawings, below follows a more detailed description of embodiments of the disclosure cited as examples.

In the drawings:

FIGS. 4a-4d show a bicycle pannier mounting arrangement comprising a releasable hook member arrangement according to the third aspect of the present disclosure.

Figure 1A:
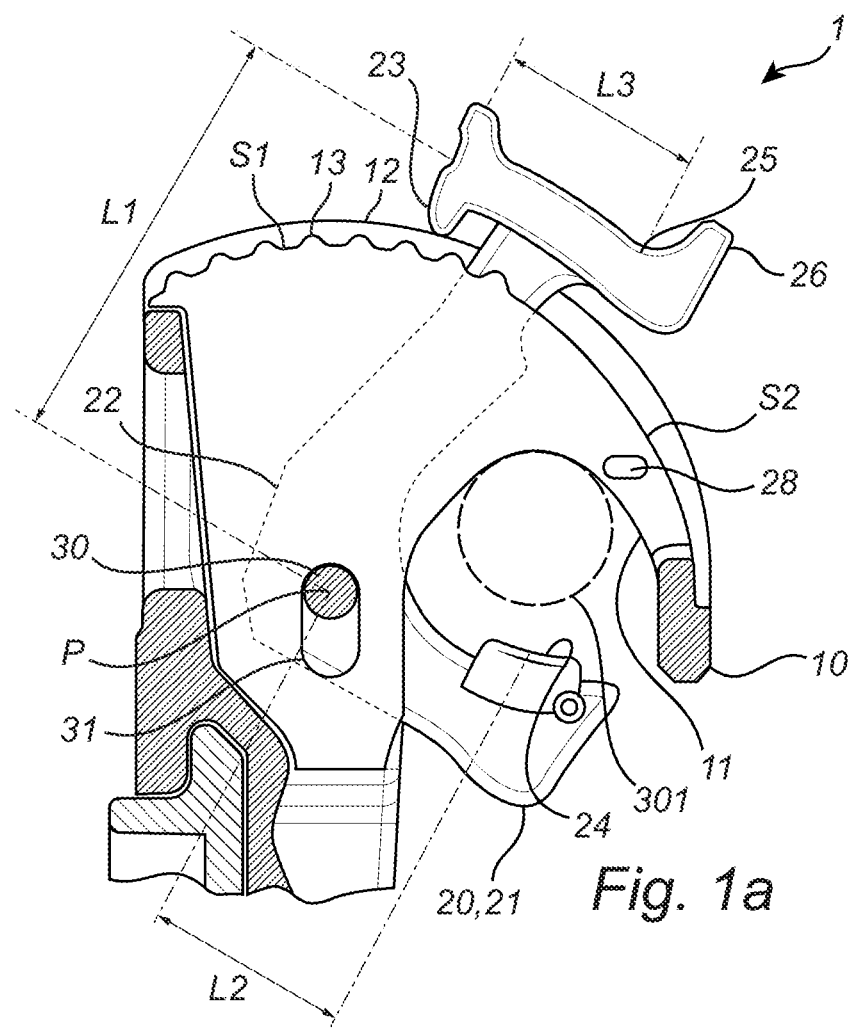
FIGS. 1a and 1b show a locking device of a bicycle pannier mounting arrangement according to an example embodiment of the present disclosure.

The drawings show diagrammatic exemplifying embodiments of the present disclosure and are thus not necessarily drawn to scale. It shall be understood that the embodiments shown and described are exemplifying and that the disclosure is not limited to these embodiments. It shall also be noted that some details in the drawings may be exaggerated in order to better describe and illustrate the disclosure. Like reference characters refer to like elements throughout the description, unless expressed otherwise.

DETAILED DESCRIPTION

Figure 1B:
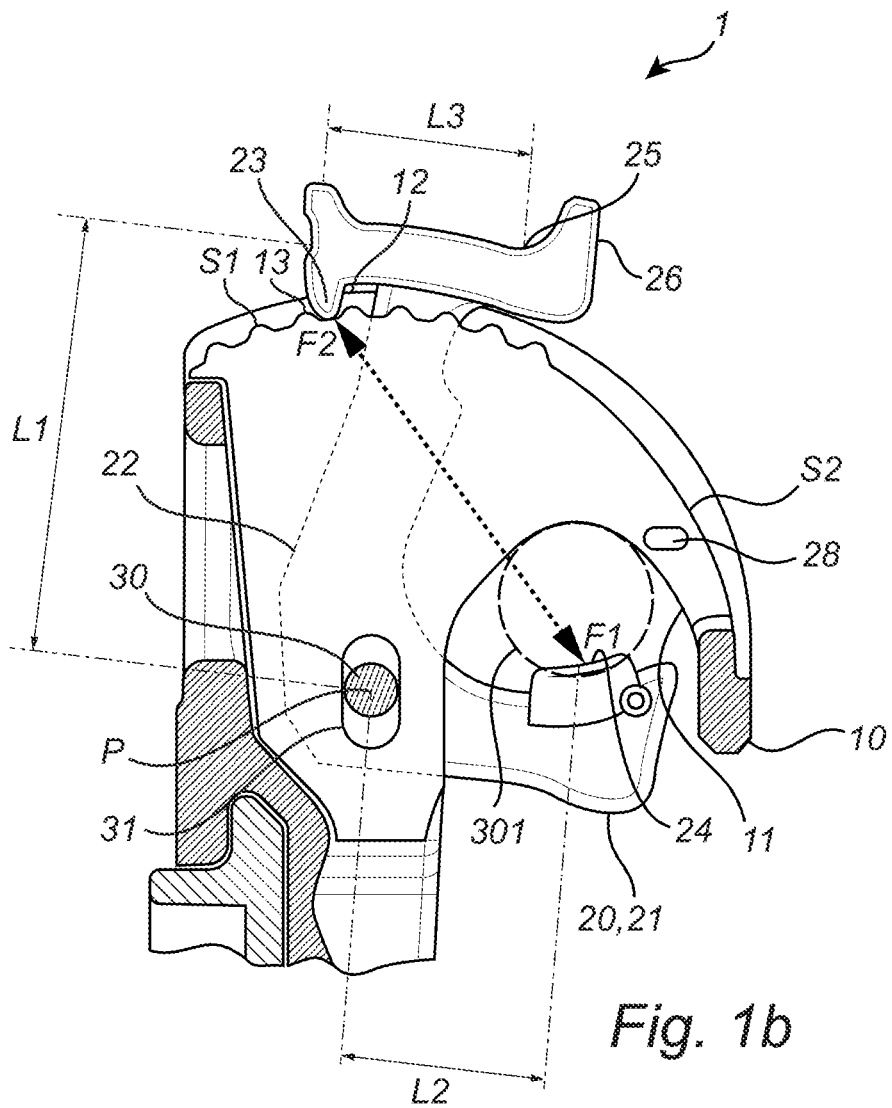

FIGS. 1a and 1b show a side view of a locking device 1 of a bicycle mounting arrangement 100 for mounting a bicycle pannier 200 (shown in FIGS. 2a and 2b) to a bicycle 300 (shown in FIG. 2b), according to an embodiment of the present disclosure. The side view is seen in a direction being parallel to the extension of a pivot axis P of the locking device 1. The locking device 1 is configured for locking the bicycle pannier 200 to an element 301 of the bicycle 300. The element 301 is here in the form of a cylindrically shaped bar of a bicycle rack.

The locking device 1 comprises a first hook member 10 and a second hook member 20. The first hook member 10 comprises an inner seat surface 11 which is adapted for enclosing a portion of the element 301. The second hook member 20 is pivotally connected about the pivot axis P by a pivotal connection 30 with respect to the first hook member 10 such that the second hook member 20 can be pivoted between an open position and a retaining position in a counter-clockwise and clockwise direction, or vice versa. The pivotal connection 30 may be a pin, such as a pin made of metal, or any other equivalent means. In the open position, the element 301 can be inserted into and removed out from the locking device, and in the retaining position, the first hook member 10 and the second hook member 20 are configured to enclose the element 301 such that it is securely attached to the locking device 1. An example of the retaining position is shown in FIG. 1b and an example of an almost open position is shown in FIG. 1a.

The second hook member 20 comprises a retaining portion 21 for retaining the elongated element when in the retaining position and a lever arm portion 22 which is rigidly connected to the retaining portion 21. As can be seen in this embodiment, the retaining portion 21 and the lever arm portion 22 may together form an L-shaped profile, or modified L-shaped profile, as seen in a sectional plane which is perpendicular to the pivot axis P. An angle between the retaining portion 21 and the lever arm portion 22 may be in the range from 70 to 110 degrees, such as 80-100, or 85-95 degrees, when seen in the sectional plane which is perpendicular to the pivot axis P. In the embodiment shown in FIGS. 1a and 1b, the angle therebetween is substantially 90 degrees.

The lever arm portion 22 extends beyond an outer peripheral surface 12 of the first hook member 10, wherein the outer peripheral surface 12 is provided on an opposite side of the first hook member 10 with respect to the seat surface 11. Further, the lever arm portion 22 comprises a locking portion 23 which is configured to pivotally lock the second hook member 20 with respect to the first hook member 10 when in the retaining position. This is accomplished by engaging the locking portion 23 with cooperating locking means 13 provided on the first hook member 10. The locking means 13 are here provided on the outer peripheral surface 12 of the first hook member, which is a preferable embodiment.

Further, the locking means 13 are here provided as a plurality of locking teeth. The locking portion 23 being provided as a protruding portion, as seen in a sectional plane being perpendicular to the pivot axis P, protruding from the lever arm portion 22 in a direction being substantially opposite to the direction in which the locking teeth 13 extend. The plurality of locking teeth 13 are provided along a curvature profile which in this embodiment has a constant radius, as seen in the sectional plane which is perpendicular to the pivot axis P. As further shown, the plurality of locking teeth 13 may be rounded, as seen in the sectional plane which is perpendicular to the pivot axis P. Thereby, during tightening of the second hook member 20 into the retaining position, a sufficient locking force may be provided by a user without the need of using a too high tightening force.

Further, the retaining portion 21 extends from the pivotal connection 30 to a portion 24 adapted to be in contact with the element 301 when in the retaining position, whereby a length L1 of the lever arm portion 22 is longer than a length L2 of the retaining portion 21 between the pivotal connection 30 and the portion 24 which is adapted to be in contact with the element 301 when in the retaining position. Thereby, an improved leverage effect is provided, which in turn will further assure a secure attachment to the element 301. The lengths L1 and L2 as shown extend in a radial direction from the pivot axis P.

Further, the pivotal connection 30 as shown in this embodiment is configured to be movable, as seen in a sectional plane being perpendicular to the pivot axis P, such that the locking portion 23 of the lever arm portion 22 can be moved between an engaged position and a disengaged position with respect to the locking means 13. An example of the disengaged position is shown in FIG. 1a and an example of the engaged position is shown in FIG. 1b. This is accomplished in that the pivotal connection 30 is movable in an aperture 31 provided in the locking device 1, wherein in this embodiment the aperture 31 is an elongated slot. Further, the aperture 31 is here provided in the first hook member 10. As can be seen from FIGS. 1a and 1b, the pivotal connection 30 is in the disengaged position provided in an uppermost location of the aperture 31, whereby in the engaged position it is moved further down in the aperture 31.

By configuring the locking device 1 in this manner, a simplified and efficient release function is provided. More particularly, a user may pull directly or indirectly in the second hook member 20 without the need of excessive force such that the pivotal connection 30 is moved in the aperture 31 and thereby such that the locking teeth 13 are disengaged from the locking portion 23. This is shown in further detail in FIGS. 3a-3c.

Further, the locking portion 23 of the lever arm portion 22 is configured to flex elastically such that it is engaged with the locking teeth 13 when the second hook member 20 is brought to the retaining position. The elastically flexible locking portion 23 is integrated with the lever arm portion 22, i.e. the portions are made of one single piece of material. The elastic flexibility is here provided by the configuration of a connection 25 between the lever arm portion 22 and the locking portion 23. More particularly, the connection 25 is provided at a distance L3 from the locking portion 23, as seen in a sectional plane being perpendicular to the pivot axis P. The distance L3 extends in a tangential direction with respect to the radial extension of the lever arm portion 22 from the pivot axis P. As further shown in FIGS. 1a and 1b, the locking portion 23 may form part of a head portion 26 of the second hook member 20. The head portion 26, which is located outside the outer peripheral surface 12, is preferably configured to be used as a gripping means for a user. Hence, a user may for example by use of hand force tighten the second hook member 20 by pushing or pulling in the head portion 26 in a counter clockwise direction about the pivot axis P, when viewed as shown in FIGS. 1a and 1b.

Further, the locking device 1 as shown in FIG. 1b is configured such that a force F1 provided on the retaining portion 21 by the element 301 when the second hook member 20 is in the retaining position is substantially provided in the opposite direction as a corresponding locking force F2 provided to the locking portion 23 by the locking teeth 13. By configuring the locking device 1 in this manner, a reliable locking function will be provided. For example, if an increased force F1 is generated on the retaining portion 21 by the element 301 caused by e.g. vibrations, the locking force F2 provided to the locking portion 23 will also increase, but substantially in the opposite direction. By having the two forces substantially aligned, as seen in a sectional plane being perpendicular to the pivot axis P, the risk that the locking portion 23 will be detached during vibrations can be reduced. In the case the two forces F1 and F2 are not aligned, the risk of accidentally disengaging the locking device may increase. A reason may be that unaligned forces provide force components acting in different directions, whereby one of the force components may act in a direction which may strive to disengage the locking device 1.

The retaining portion 21 may comprise an elastic portion 24 adapted for contacting the element 301 when the second hook member 20 is in the retaining position. This has shown to be beneficial for protecting the element from unnecessary damages, scratches etc. Further, the elastic portion 24 has also shown to further improve the locking function. In fact, the force F2 provided on the locking portion 23 can be further increased since the elastic portion 24 allows the locking portion 23 to be tightened further when the second hook member 20 is provided to the retaining position.

The second hook member 20 as shown in FIGS. 1a and 1b is pivotable between the retaining position and the open position such that the locking portion 23 moves along a curvature profile of the first hook member 10 which has a first section S1 comprising the locking teeth 13 and a second section S2 which is free from the locking teeth, whereby the first section S1 is having a larger radius than a radius of the second section S2, when seen in a sectional plane being perpendicular to the pivot axis P. The curvature profile is here provided on the outer peripheral surface 12 of the first hook member 10 and forms a convexly shaped outer peripheral surface 12. By this configuration it will be easier for a user to move the second hook member 20 between the open position and the retaining position, and vice versa. More particularly, when the locking portion 23 is located within the first section S1 and when the pivotal connection 30 is located in the uppermost location in the aperture 31, a radial distance between the locking portion 23 and the first section S1 will be smaller than what a radial distance would be between the locking portion 23 and the second section S2 when the locking portion is located within the second section S2 and when the pivotal connection 30 is located in the uppermost location in the aperture 31.

Further, the seat surface 11 is substantially parabola shaped, when seen in a sectional plane being perpendicular to the pivot axis P. By forming the seat surface in this manner, the locking device 1 may more easily be locked to elements 301 of different sizes, i.e. elements 301 of different cross-sectional sizes.

Figure 2A:
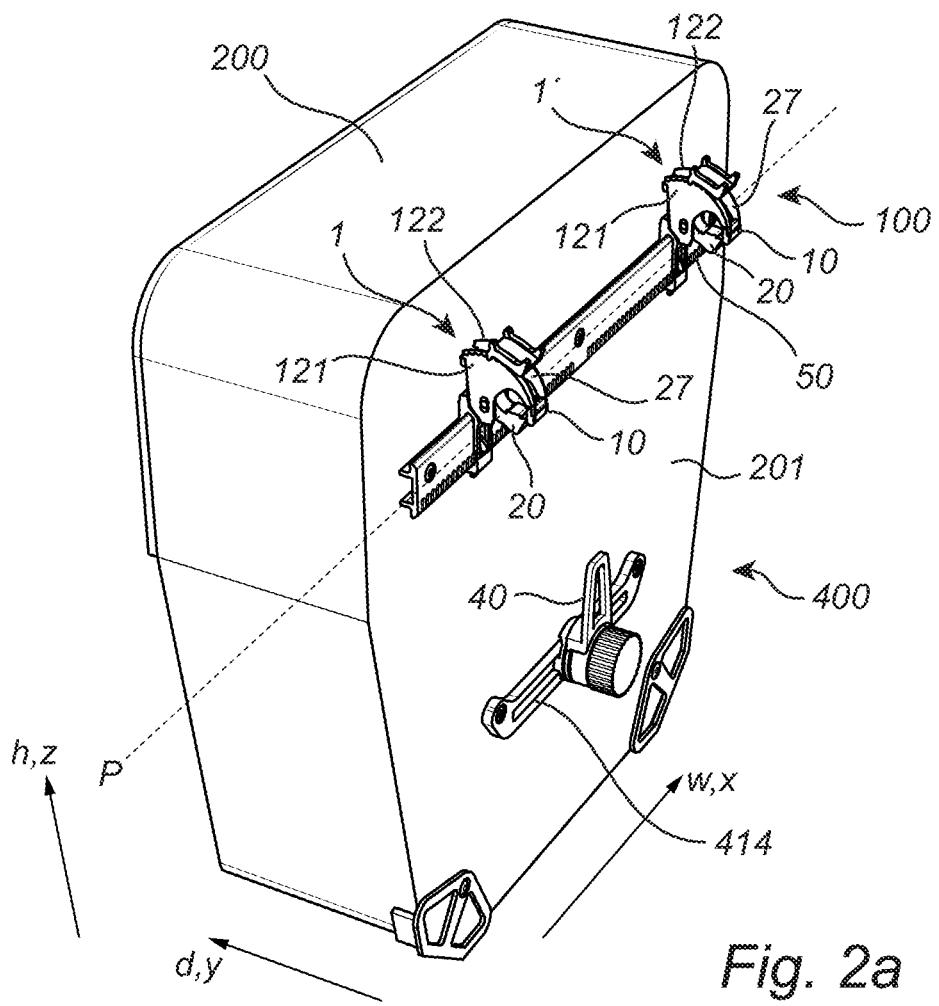
FIG. 2a shows a bicycle pannier mounting arrangement according to an example embodiment of the present disclosure which is provided on a bicycle pannier.

In FIG. 2a, a perspective view of a bicycle pannier 200 comprising a bicycle pannier mounting arrangement 100 according to an example embodiment of the present disclosure is shown. The bicycle pannier 200 extends in a width direction w, a height direction h and a depth direction d, which defines a three-dimensional space for accommodating a load. The three directions are perpendicular with respect to each other, whereby the direction w corresponds to an x-direction, the direction d to a y-direction and the direction h to a z-direction of a Cartesian coordinate system. The bicycle pannier 200 may for example comprise one or more straps (not shown), or the like, which a user can use for carrying the bicycle pannier 200 when it is released from the bicycle. The bicycle pannier mounting arrangement 100 comprises two locking devices 1 and 1' which are offset in the pannier's width direction w, which in turn is aligned with the pivot axis P. The locking devices 1 and 1' are both configured as the locking device 1 as shown in FIGS. 1a and 1b. Further, the locking devices 1 and 1' are configured to be moved between respective different positions in the pannier's width direction w, thereby providing a more flexible mounting arrangement which can be adapted for different types of bicycles. The two locking devices 1 and 1' are preferably connected to and movable along a pannier attachment element 50 which is attached to the pannier 200. The pannier attachment element 50 may be in the form of a rail which comprises a plurality of locking positions for locking the locking devices 1 and 1' such that they are prevented from being moved in the width direction w when locked thereto.

In FIG. 2a it can be further seen that the second hook member 20 and the first hook member 10 are configured such that the second hook member 20 can be moved between the retaining position and the open position in an opening 27 of the first hook member 10. More particularly, the outer peripheral surface 12 is here formed by two tracks 121 and 122 which are offset with respect to each other, as seen in the width direction w. Hence, the two tracks 121 and 122 are offset in a direction being parallel to the pivot axis P. The locking teeth are preferably provided on both tracks 121 and 122, but may also be provided on only one of the tracks.

The bicycle pannier 200 as shown in FIG. 2a further comprises a third hook member 40 according to the third aspect of the disclosure. The third hook member 40 is offset from the locking devices 1 and 1' in the pannier's height direction h.

Figure 2B:
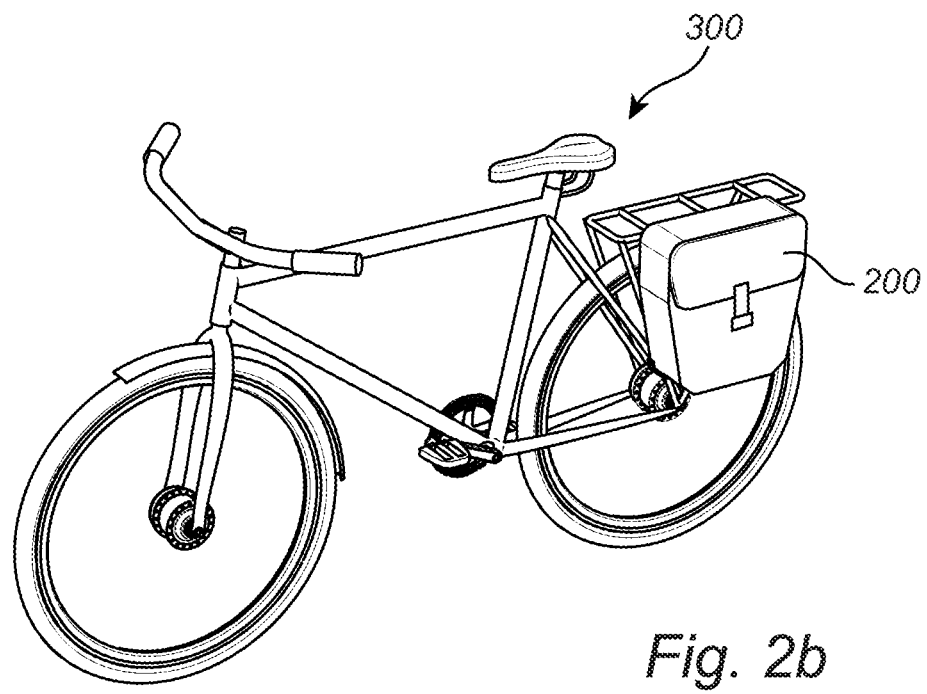
FIG. 2b shows a bicycle pannier according to an embodiment of the present disclosure which is provided on a side of a bicycle.

FIG. 2b shows the bicycle pannier 200 as shown in FIG. 2a when it is mounted onto a bicycle 300 by the bicycle mounting arrangement 100.

Figure 3A:
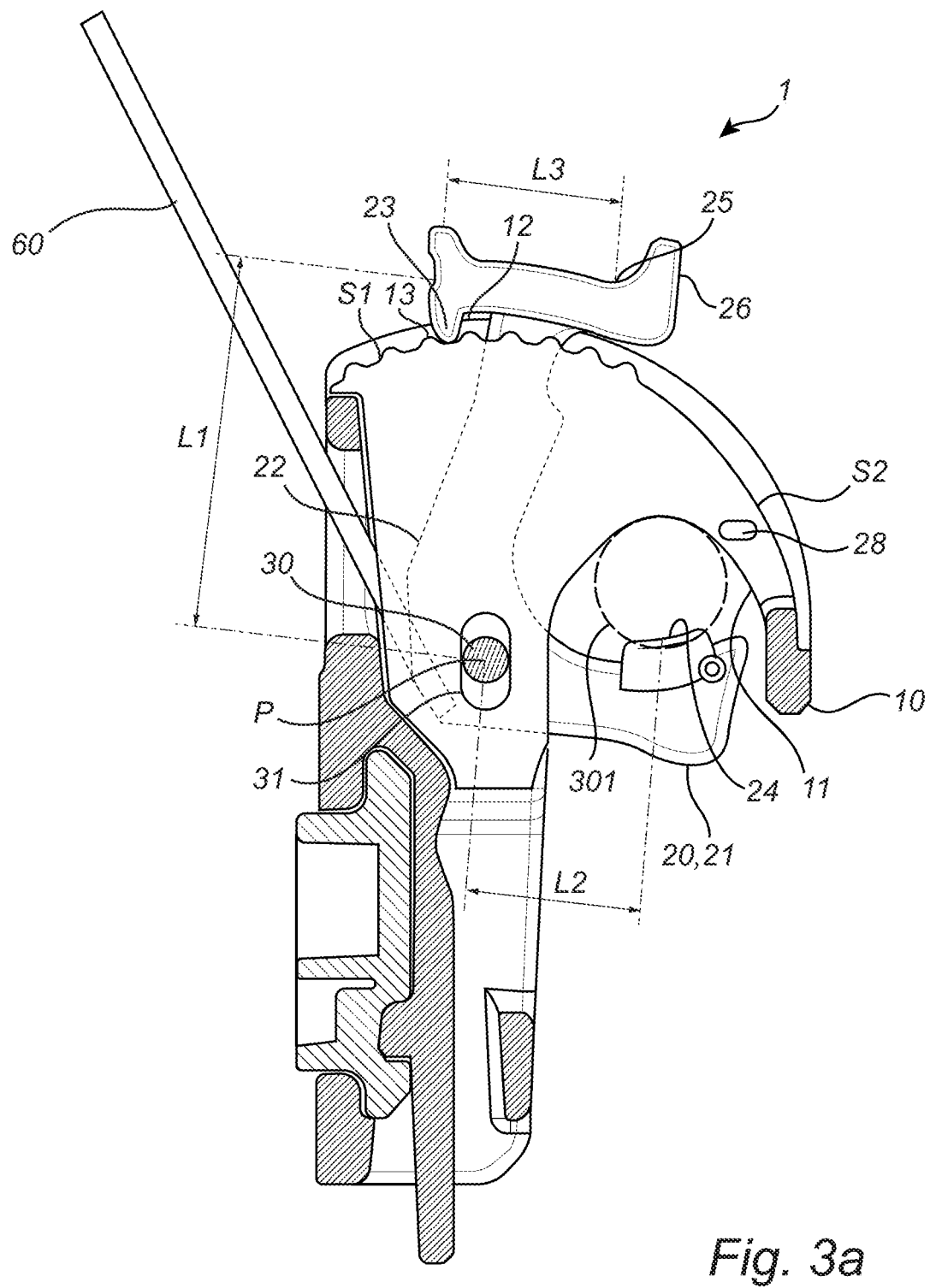
FIGS. 3a-3c show a locking device of a bicycle pannier mounting arrangement according to an example embodiment of the present disclosure.
Figure 3B:
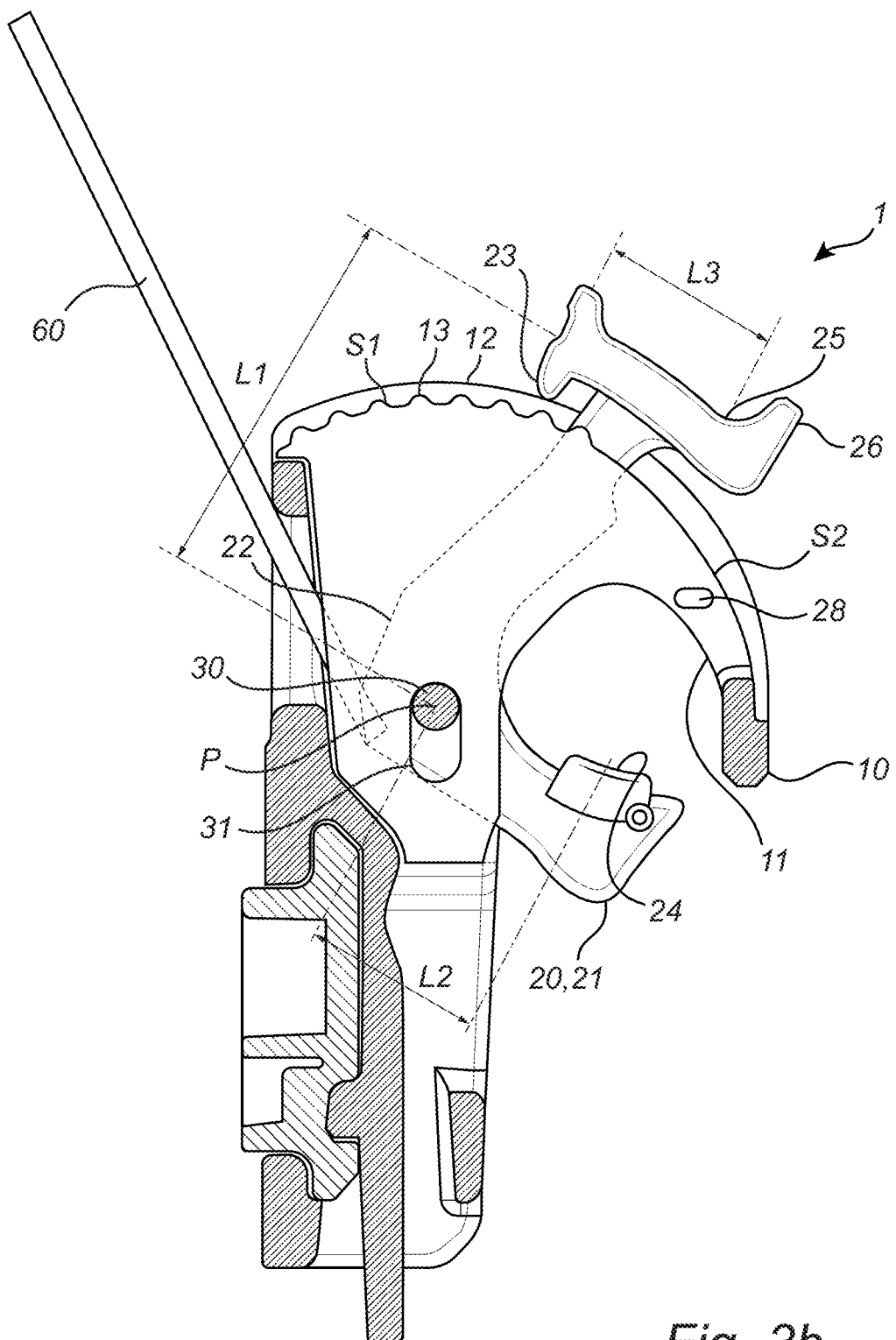
Figure 3C:
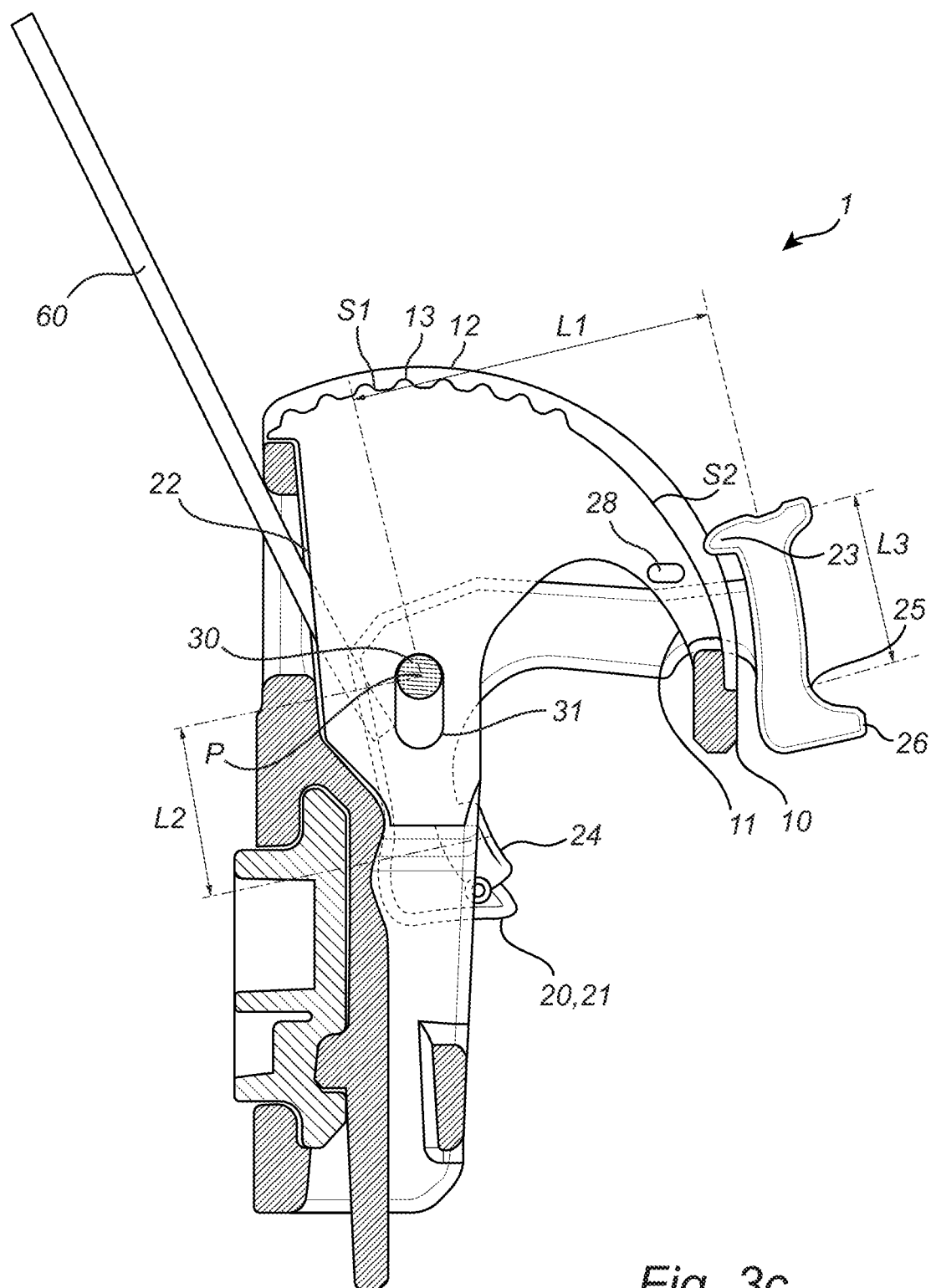
Figure 4B:
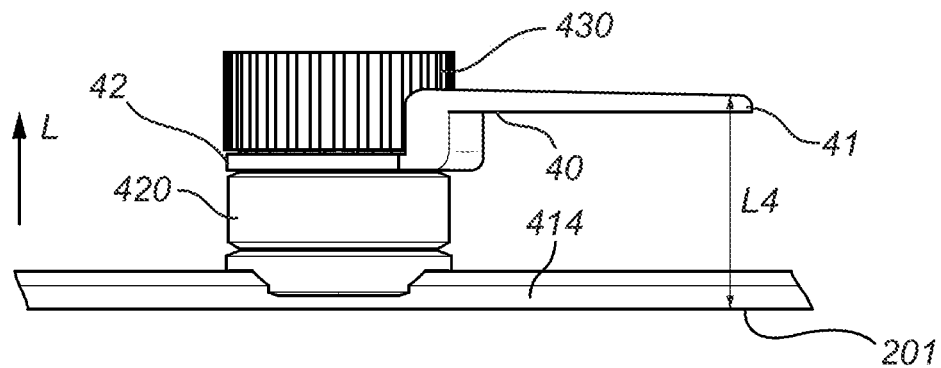
Figure 4C:
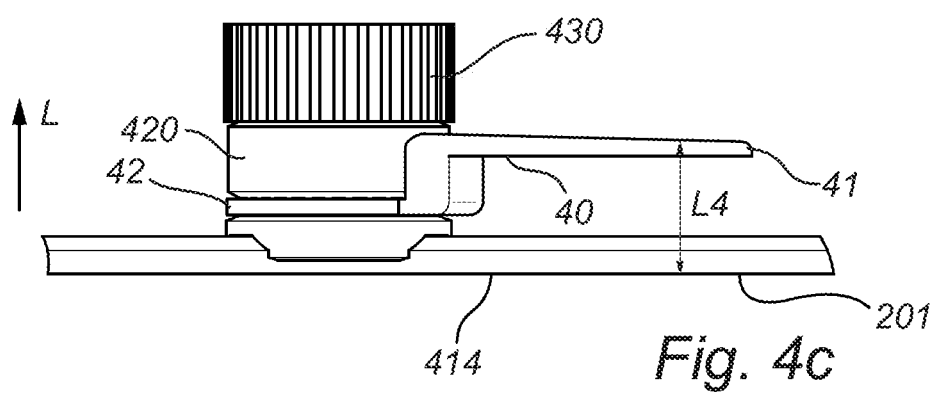
Figure 4D:
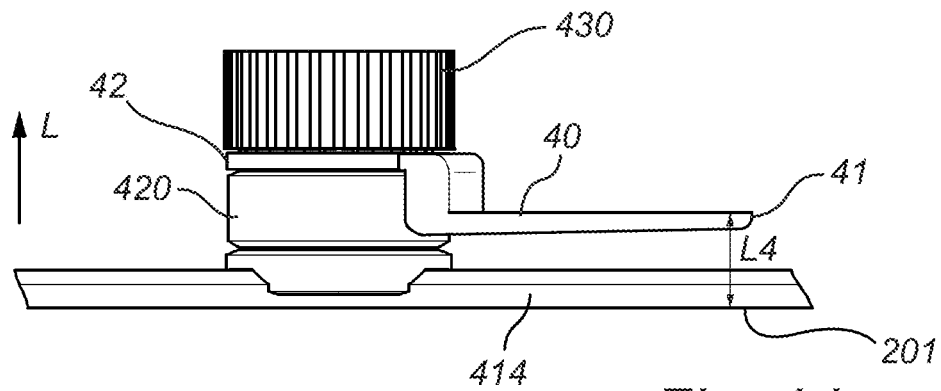

FIGS. 3a-3c show a locking device of a bicycle pannier mounting arrangement according to an example embodiment of the present disclosure. The locking device 1 as shown is similar in configuration as the locking device 1 shown in e.g. FIGS. 1a and 1b, unless explicitly expressed otherwise. The second hook member 20 is provided in a retaining position in FIG. 3a, in an almost open position in FIG. 3b and in a fully open position in FIG. 3c.

The bicycle pannier mounting arrangement as shown further comprises a releasing member 60 connected to the second hook member 20 and adapted for releasing the second hook member 20 from its retaining position, whereby pulling in the releasing member 60 moves the pivotal connection 30 in the aperture 31 towards the uppermost location such that the locking portion 23 is released to its disengaged position.

The releasing member 60 is here a flexible member in the form of a strap. The strap 60 is preferably inter-connected to the locking devices 1 and 1' as shown in FIG. 2a. Thereby both locking devices 1 and 1' can be released at once and also a gripping section (not shown) can be easily provided between the two locking devices 1 and 1'.

As can be further seen in especially FIG. 3c, the locking device 1 is configured such that the element 301 will come in contact with the lever arm portion 22 before the element 301 contacts the seat surface 11 when the second hook member 20 is in the open position. This is in this embodiment accomplished in that the second hook member 20 can be pivoted a distance such that the lever arm portion 22 will overlap an area where the element 301 is intended to be provided when it is locked to the locking device 1, as seen in a sectional plane being perpendicular to the pivot axis P. By configuring the locking device 1 like this, a bicycle pannier 200 may be partially retained or partially locked to the bicycle 300 even before a user has tightened the second hook member 20 by pushing or pulling in e.g. the head portion 26. This can be accomplished by use of gravitational forces exerted on the bicycle pannier 200 when it is provided onto the bicycle 300. An example of the partial locking position is the position of the second hook member 20 as shown in FIG. 3b, i.e. the almost open position. In this position, the retaining portion 21 may have moved a distance about the pivot axis P such that it may hinder the pannier 200 from being released from the element 301 if an upwardly directed force would be exerted on the pannier 200, i.e. a force which is directed in an opposite direction with respect to the gravitational force.

The embodiments as shown in FIGS. 3a-3c and in FIGS. 1a and 1b further comprises a protruding element 28 which protrudes in a direction which is parallel to the pivot axis P. The protruding element(s) 28, which may be provided on one of, or both of, the tracks 121 and 122 of the first hook member 10 is/are configured for hindering the second hook member 20 from being moved from the open position to the retaining position without providing a force onto the second hook member 20 with a predetermined force level. Thereby, the second hook member 20 may be kept in its open position when the bicycle pannier 200 is released from the bicycle 300.

FIGS. 4a-4d show a bicycle pannier mounting arrangement comprising a releasable hook member arrangement 400 according to the third aspect of the present disclosure.

The releasable hook member arrangement 400 comprises:
an elongated element 410 extending in a longitudinal direction L. The elongated element 410 is in this embodiment cylindrically formed and is having threads 411 on an envelope surface 412 thereof. The hook member arrangement 400 further comprises a hook member 40 comprising a hook portion 41 and a connection portion 42. The connection portion 42 of this embodiment comprises a bore 43 for connecting the hook member 40 to the elongated element 410. The hook portion 41 is adapted to extend substantially in a direction being perpendicular to the longitudinal direction L when the hook member 40 is connected to the elongated element. The longitudinal direction L does here correspond to the depth direction d of the pannier as shown in e.g. FIG. 2a.

The hook member arrangement 400 further comprises at least one distance element 420 comprising a bore 421 for connecting the at least one distance element 420 to the elongated element 410, and a locking member 430 for locking the hook member 40 and the at least one distance element 430 to the elongated element 410. The locking member 430 is here a nut member and the locking is provided by engaging the threads 411 of the elongated element by corresponding threads (not shown) provided on the locking member 430. The hook member 40 is configured such that the hook portion 41 and the connection portion 42 are offset, as seen in the longitudinal direction L, when the hook member 40 is connected to the elongated element 410. Thereby, a distance L4 in the longitudinal direction L between the hook portion 41 and a back surface 201 of the bicycle pannier 200 can be varied by releasing the hook member 40, turning it around and mounting it in an opposite mounting direction, see e.g. the different mounting configurations in FIGS. 4b and 4d. Further, the distance L4 may also be varied by positioning the hook member 40 and the at least one distance element 420 in different order on the elongated element 410, see FIG. 4c.

The releasable hook member arrangement 400 may be combined with any other type of bicycle pannier mounting arrangement, but preferably with the bicycle pannier mounting arrangement 100 as disclosed herein. By being able to vary he distance L4, the pannier's 200 attachment to the bicycle 300 may be improved by avoiding unnecessary pivoting about the element 301 when in use.

The elongated element 410 further comprises a T-shaped end 413 which is adapted to be movable in a correspondingly formed track 414, see FIG. 2a, such that the elongated element 410 can be movable in the direction being substantially perpendicular to the longitudinal direction L. In FIG. 2a it can be seen that the elongated element 410, and hence also the hook member 40 can be moved in a direction which is parallel to the width direction w of the bicycle pannier 200.

The releasable hook member arrangement 400 of this embodiment further comprises an additional distance element 430 configured to be provided in-between the hook member 40 and the bicycle pannier 200. Further, the connection portion 42, the distance element 420 and the additional distance element 430 may comprise means for hindering rotational movement when the hook member 40 is connected to the elongated element 410.

It is to be understood that the present disclosure is not limited to the embodiments described above and illustrated in the drawings; rather, the skilled person will recognize that many changes and modifications may be made within the scope of the appended claims.

What is claimed is:

1. A bicycle pannier mounting arrangement for mounting a bicycle pannier to a bicycle, the bicycle pannier mounting arrangement comprising:
a locking device for locking the bicycle pannier to an element of the bicycle, wherein the locking device comprises:
a first hook member comprising an inner seat surface configured to enclose a portion of the element of the bicycle; and
a second hook member pivotally connected about a pivot axis by a pivotal connection with respect to the first hook member such that the second hook member can pivot between an open position and a retaining position,
wherein, in the open position, the element of the bicycle can be inserted into and removed from the locking device,
wherein, in the retaining position, the first hook member and the second hook member are configured to enclose the element of the bicycle such that the element is securely attached to the locking device,
wherein the second hook member comprises a retaining portion for retaining the element of the bicycle when in the retaining position and a lever arm portion rigidly connected to the retaining portion, the lever arm portion extending beyond an outer peripheral surface of the first hook member,
wherein the outer peripheral surface is provided on an opposite side of the first hook member with respect to the inner seat surface, and
wherein the lever arm portion comprises a locking portion which is configured to pivotally lock the second hook member with respect to the first hook member when in the retaining position by engaging the locking portion with cooperating locking means provided on the first hook member.

2. The bicycle pannier mounting arrangement according to claim 1, wherein:
the retaining portion extends at least partly from the pivotal connection to a portion configured to be in contact with the element of the bicycle when in the retaining position, and
a length of the lever arm portion is longer than a length of the retaining portion between the pivotal connection and the portion configured to be in contact with the element of the bicycle when in the retaining position.

3. The bicycle pannier mounting arrangement according to claim 1, wherein the pivotal connection is configured to be movable, as seen in a sectional plane being perpendicular to the pivot axis, such that the locking portion of the lever arm portion can be moved between an engaged position and a disengaged position with respect to the cooperating locking means.

4. The bicycle pannier mounting arrangement according to claim 3, wherein the pivotal connection is movable in an aperture provided in the locking device.

5. The bicycle pannier mounting arrangement according to claim 3, further comprising a releasing member connected to the second hook member and configured to release the second hook member from the retaining position, whereby pulling in the releasing member moves the pivotal connection such that the locking portion is released to the disengaged position.

6. The bicycle pannier mounting arrangement according to claim 1, wherein the locking portion of the lever arm portion is configured to flex elastically such that it is engaged with the cooperating locking means when the second hook member is in the retaining position.

7. The bicycle pannier mounting arrangement according to claim 1, wherein the locking device is configured such that a force provided on the retaining portion by the element of the bicycle when the second hook member is in the retaining position is substantially provided in the opposite direction to a corresponding locking force provided to the locking portion by the cooperating locking means.

8. The bicycle pannier mounting arrangement according to claim 1, wherein the retaining portion comprises an elastic portion configured to contact the element of the bicycle when the second hook member is in the retaining position.

9. The bicycle pannier mounting arrangement according to claim 1, wherein the cooperating locking means of the first hook member comprises a plurality of locking teeth.

10. The bicycle pannier mounting arrangement according to claim 9, wherein the plurality of locking teeth are rounded, as seen in a sectional plane being perpendicular to the pivot axis.

11. The bicycle pannier mounting arrangement according to claim 1, wherein the second hook member is pivotable between the retaining position and the open position such that the locking portion moves along a curvature profile of the first hook member having a first section comprising the cooperating locking means and a second section omitting the cooperating locking means, wherein the first section comprises a radius larger than a radius of the second section, when seen in a sectional plane being perpendicular to the pivot axis.

12. The bicycle pannier mounting arrangement according to claim 1, wherein the inner seat surface is substantially parabola shaped, when seen in a sectional plane being perpendicular to the pivot axis.

13. The bicycle pannier mounting arrangement according to claim 1, comprising a second locking device offset with respect to the locking device in a direction parallel to the pivot axis.

14. The bicycle pannier mounting arrangement according to claim 1, further comprising a third hook member for locking the bicycle pannier to a second portion of the element of the bicycle, the third hook member being offset from the locking device, when seen in a sectional plane being perpendicular to the pivot axis.

15. A bicycle pannier comprising the bicycle pannier mounting arrangement according to claim 1.

16. A pannier mounting arrangement for mounting a pannier to a vehicle, the pannier mounting arrangement comprising:
   a locking device configured to secure the pannier to a vehicle rack of the vehicle, wherein the locking device comprises:
      a first hook member comprising an inner seat surface configured to enclose a portion of the vehicle rack; and
      a second hook member comprising:
         a retaining portion configured to retain the portion of the vehicle rack; and
         a lever arm portion rigidly connected to and integrally formed with the retaining portion and extending beyond an outer peripheral surface of the first hook member,
      wherein the second hook member is pivotally connected about a pivot axis by a pivotal connection with respect to the first hook member such that the second hook member can pivot between an open position and a retaining position, and
      wherein the first hook member comprises a plurality of locking teeth configured to interlock with the second hook member.

17. The pannier mounting arrangement according to claim 16, further comprising a third hook member configured to secure a second portion of the vehicle rack.

18. The pannier mounting arrangement according to claim 17, wherein the third hook member is disposed below the locking device relative to a back surface of the pannier.

19. The pannier mounting arrangement according to claim 16, further comprising a second locking device disposed parallel to the pivot axis.

20. A bicycle pannier comprising the bicycle pannier mounting arrangement according to claim 16.

21. A pannier mounting arrangement for mounting a pannier to a vehicle, the pannier mounting arrangement comprising:
   a locking device configured to secure the pannier to a vehicle rack of the vehicle, wherein the locking device comprises:
      a first hook member comprising an inner seat surface configured to enclose a portion of the vehicle rack; and
      a second hook member comprising:
         a retaining portion configured to retain the portion of the vehicle rack; and
         a lever arm portion connected to the retaining portion, the lever arm including a head portion that extends beyond an outer peripheral surface of the first hook member,
      wherein the second hook member is pivotable about a pivot axis relative to the first hook member between an open position and a retaining position,
      wherein pivoting the head portion about the pivot axis causes the second hook member to pivot about the pivot axis, and
      wherein a lock is configured to lock the position of the second hook member with respect to the first hook member.

22. The pannier mounting arrangement according to claim 21, wherein the head portion moves along a curvature profile of the first hook member when the head portion is pivoted about the pivot axis.

23. A bicycle pannier comprising the bicycle pannier mounting arrangement according to claim 21.

* * * * *